United States Patent [19]
Weber

[11] 4,186,498
[45] Feb. 5, 1980

[54] SOLE WITH HIGH HEEL FOR WOMAN FOOTWEAR, CONSISTING OF A PLASTIC MATERIAL MONOBLOCK HAVING A RIGID AND A FLEXIBLE PART

[75] Inventor: Ida Weber, Lugano, Switzerland

[73] Assignee: B.M.C.-Brevets-Marques-Chaussures S.A., Zug, Switzerland

[21] Appl. No.: 848,093

[22] Filed: Nov. 3, 1977

[51] Int. Cl.² .................... A43B 13/04; A43B 13/28
[52] U.S. Cl. .................... 36/32 R; 36/24.5
[58] Field of Search ............ 36/32 R, 24.5, 34 A, 36/25 R, 76

[56] References Cited
U.S. PATENT DOCUMENTS

| | | | |
|---|---|---|---|
| 2,303,431 | 12/1942 | Brophy | 36/34 A |
| 2,867,919 | 1/1959 | Nappa | 36/24.5 |
| 2,912,771 | 11/1959 | Harrison | 36/24.5 X |
| 2,931,110 | 4/1960 | Pietrocola | 36/32 R |
| 4,041,620 | 8/1977 | Anderson | 36/32 R |

FOREIGN PATENT DOCUMENTS

| | | | |
|---|---|---|---|
| 768339 | 10/1967 | Canada | 36/24.5 |
| 1295372 | 5/1962 | France | 36/24.5 |
| 1476115 | 4/1966 | France | 36/24.5 |
| 576866 | 5/1958 | Italy | 36/24.5 |

*Primary Examiner*—James Kee Chi
*Attorney, Agent, or Firm*—Bucknam and Archer

[57] ABSTRACT

An integral sole, shank and heel monoblock for women footwear is described comprising a sole portion, a high heel portion and a shank portion between the sole portion and the heel portion, the shank and the heel portion consisting of rigid plastic material, the sole portion consisting of flexible plastic material, the end of the shank portion opposite the end which is integral with the heel portion being provided with through-holes, the flexible plastic material of the sole portion filling the through-holes. Preferably the through-holes are in oblique direction.

1 Claim, 3 Drawing Figures

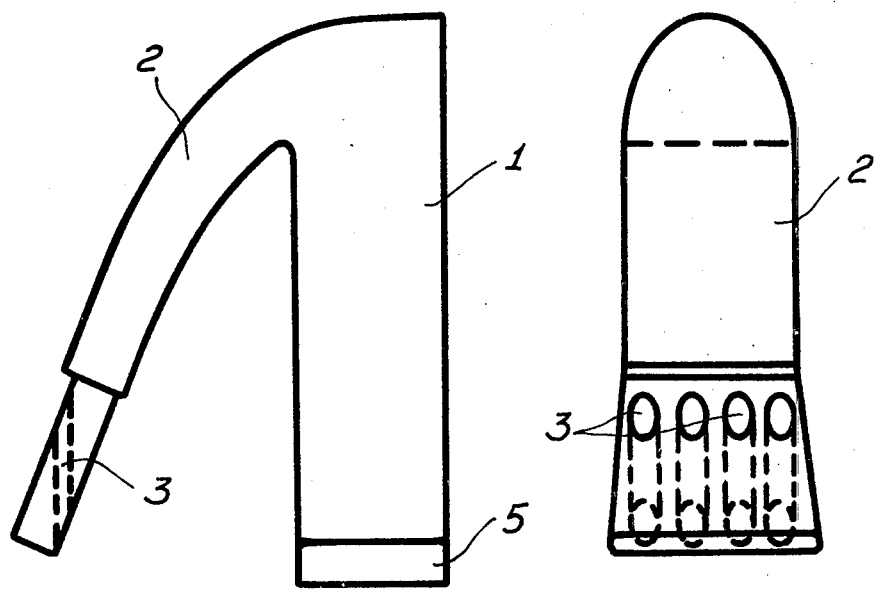
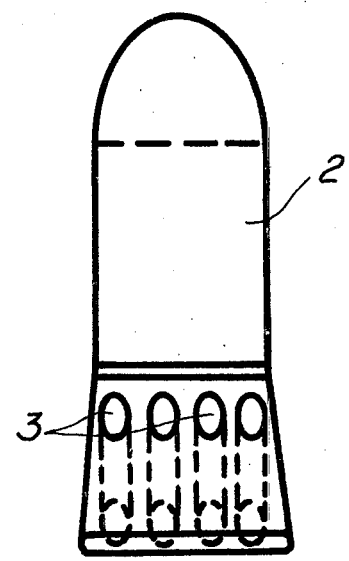
Fig. 1  Fig. 2
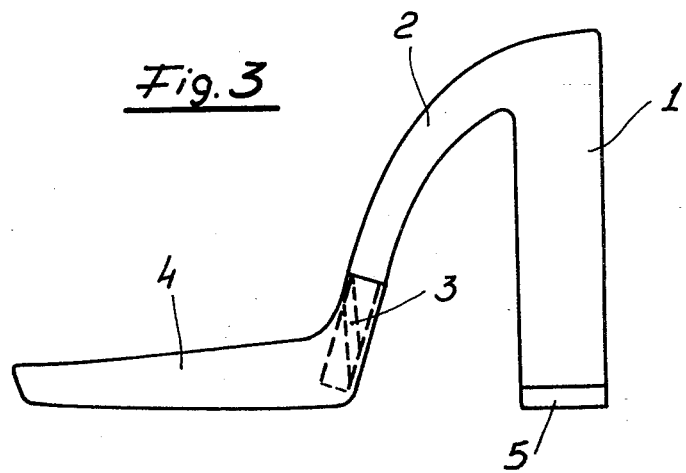
Fig. 3

SOLE WITH HIGH HEEL FOR WOMAN FOOTWEAR, CONSISTING OF A PLASTIC MATERIAL MONOBLOCK HAVING A RIGID AND A FLEXIBLE PART

This invention relates to a sole comprising the heel for woman footwear, being formed of a monolithic structure consisting of plastic material, having a rigid portion and a flexible portion.

As well known the basic structure of a generic shoe substantially includes a sole and a heel made according to known methods from leather and rubber.

The same structure shows in particular a median part, located between the heel and the sole, which should be characterized by a suitable rigidity in order to conveniently sustain the foot arc.

The said median part, commonly called shank and a flexible front part are, adapted to protect the forefoot in its motion. At the present time, due to the leather shortage there exists a tendency to replace leathers by suitable plastic materials which may be more easily located and being more easily workable.

The difficulty being encountered in generalizing such a productive method is due to the aforementioned requirement to impart to the basic structure of the shoe distinct characteristic features of rigidity and flexibility, without weighing the line of the shoe itself.

On the other hand, it not practically possible to utilize flexible material, even if of wide plan and heavy thickness for the building of the heel, since the weight of the person would provoke on the heel itself considerable deformations. The aforesaid functional requirement is instead fully satisfied by the sole comprising a high heel for woman footwear according to this invention.

The said sole comprises in fact in a monolithic structure a front part being flexible and a rear part being rigid. More in detail, the sole for woman footwear according to the present invention includes a heel and an intermediate portion, assimilable to the traditional shank obtained from rigid plastic material.

To the said parts there is anchored during the process of preparation the front portion of the sole, made from conveniently flexible plastic material.

In practice, the said rigid portion shows at its end, designed to enter into contact with the flexible portion, transversal through-holes.

Into the holes fit continuous threads of flexible plastic material, performing a fixed connection between the two different structures.

These and further characteristic features of a functional and constructional nature of the sole with high heel for woman footwear of this invention could better be understood from the following detailed description when taken in conjunction with the various figures on the accompanying drawing relating to a generic embodiment form of the sole itself, in which:

FIG. 1 shows a front view of the rigid portion of such sole;

FIG. 2 represents an assembly view of the sole with high heel; and

FIG. 3 depicts an assembly view of the sole with high heel of this invention.

Referring now particularly to the reference numerals of the various figures on the accompanying drawing, the sole with high heel for woman footwear of this invention consists of a rigid plastic material portion including the heel 1 of suitable height and the shank 2 being conveniently curved. In particular at the free end of the aforementioned shank there are provided transversal through-holes 3, preferably having an oblique direction.

The rigid portion may be obtained by way of example from polystyrene, polyvinyl chloride, polypropylene, polythene, A.B.S. and the like.

To the same premolded portion there is connected during the molding process the front portion 4 of the sole obtained from flexible material.

More in detail, such flexible portion is obtained from polyurethan or polyethylene of the expanded type or from ethylene-vinyl-acetate or natural or synthethic rubber or other suitable material, which may be shaped by molding.

The practical manufacture of the instant basic structure for a footwear may be obtained by utilizing a multiple mould, suitably split by a removable partition into which there is poured at first the rigid material and then, after the molding of the same, the flexible material.

Alternatively, a mould may be used for the molding of the structure rigid part by inserting then such rigid part into the mould for the molding of the flexible portion. In both cases, on the other hand, by way of mere examples it is the main object to perform a stable anchoring between the two sole parts so that they build a compact and homogeneous monoblock.

Such result is attained by embedding the free end of the shank in the flexible portion 4 serving as support for the forefoot by arrangements adapted to the effect that the same flexible portion is adequately penetrated by the rigid part.

On the free face of the heel there is further applied by the most suitable processes an overheel 5.

It should be also stressed that the instant structure includes all components being the traditional parts of a sole, so that it ensures to perform a footwear by simple gluing of the vamp on its upper surface.

From the foregoing description and from perusal of the various figures on the accompanying drawing one may easily see the great functional character and the practical application, characterizing the sole comprising a high heel for women footwear according to the present invention.

What we claim is:

1. An integral sole, shank and heel monoblock for women footwear comprising a sole portion, a high heel portion and a shank portion between the sole portion and the heel portion, the shank and the heel portion consisting of rigid plastic material, the sole portion consisting of flexible plastic material, the end of the shank portion opposite the end which is integral with the heel portion having been provided with through-holes in oblique direction with resect to the shank, the flexible plastic material of the sole portion having filled the through-holes.

* * * * *